United States Patent [19]

Dalgleish et al.

[11] 4,005,522
[45] Feb. 1, 1977

[54] METHOD OF CONNECTING TWO OPTICAL FIBRES IN END TO END RELATIONSHIP

[75] Inventors: Jack Frank Dalgleish, Ottawa; Helmut Hans Lukas, Carleton Place, both of Canada

[73] Assignee: Northern Telecom Limited, Montreal, Canada

[22] Filed: Apr. 5, 1976

[21] Appl. No.: 673,366

Related U.S. Application Data

[62] Division of Ser. No. 549,661, Feb. 13, 1975, Pat. No. 3,972,585.

[52] U.S. Cl. .................................. 29/517; 29/460
[51] Int. Cl.² .................. B21D 39/00; B23P 11/00
[58] Field of Search .......... 29/517, 460; 350/96 C, 350/320

[56] References Cited

UNITED STATES PATENTS

| | | | |
|---|---|---|---|
| 2,686,359 | 8/1954 | Spencer | 29/517 |
| 2,965,147 | 12/1960 | Hoffman | 29/517 UX |
| 3,192,622 | 7/1965 | Bannerman | 29/517 |
| 3,320,356 | 5/1967 | Kirwin | 29/517 X |
| 3,655,275 | 4/1972 | Seagreaves | 350/96 C X |
| 3,768,146 | 10/1973 | Braun et al. | 29/517 X |
| 3,846,010 | 11/1974 | Love | 350/96 C X |
| 3,861,781 | 1/1975 | Hasegawa et al. | 350/96 C |
| 3,904,269 | 9/1975 | Lebduska et al. | 350/96 C |

*Primary Examiner*—Charlie T. Moon
*Attorney, Agent, or Firm*—Sidney T. Jelly

[57] ABSTRACT

Two optical fibres are connected in end to end relationship by positioning the fibres in a tubular connecting member, the member having a preformed section which has a number of lobes formed in the tube, the radially inward extremities of the lobes defining an axial bore into which the uncoated ends of the fibres can slide. After positioning the fibre ends in the preformed section the plastic coating of each fibre is gripped by crimping the tubular member. For a splice both coated fibres are crimped into a single tubular member. For a releasable connector two tubular members are used, one incorporating the preformed section, and the two tubular members each crimped on to a fibre, the two members held together.

4 Claims, 18 Drawing Figures

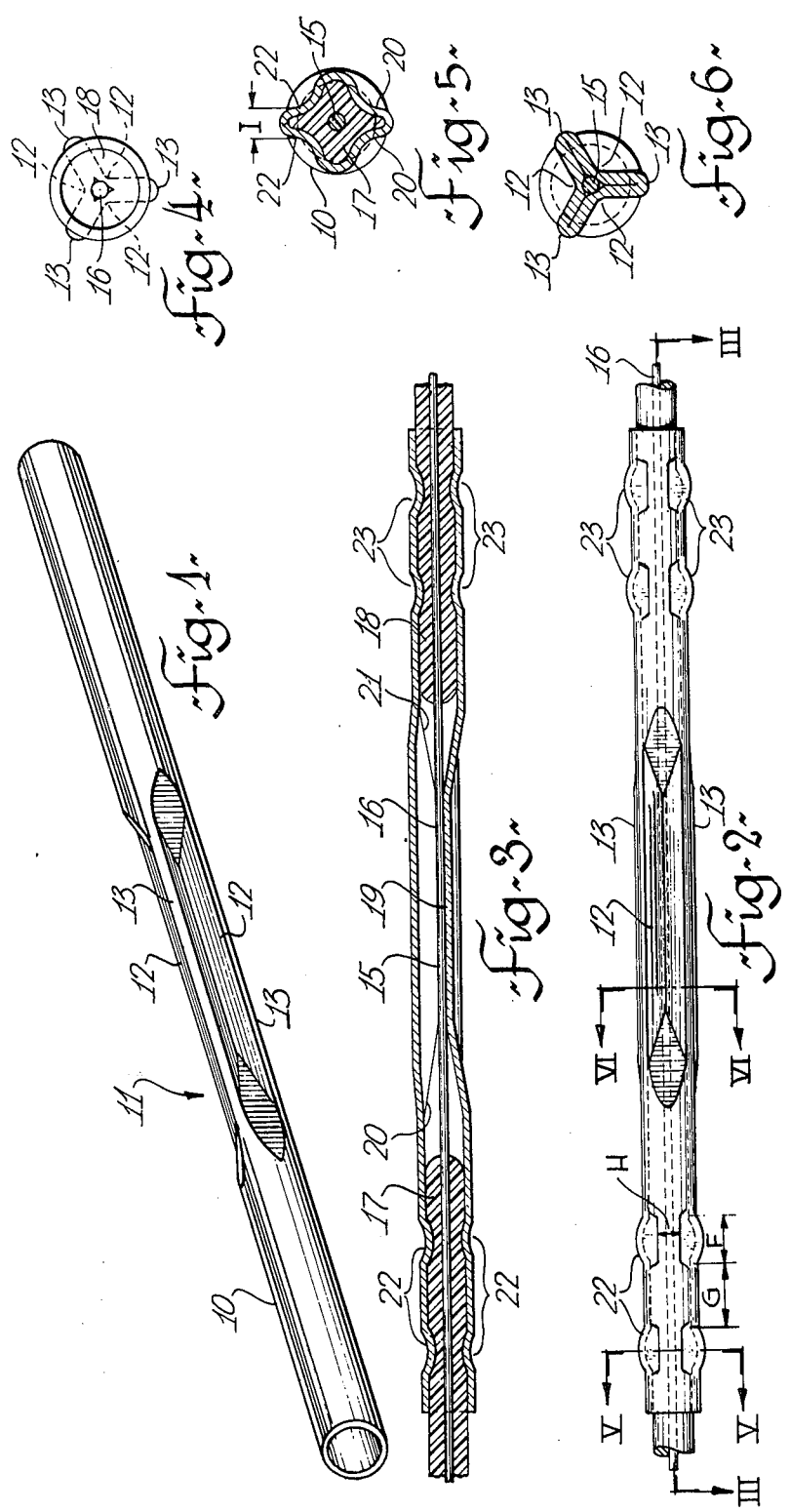

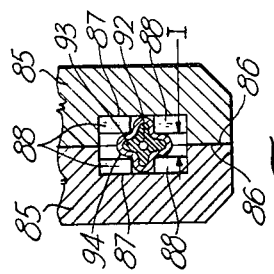
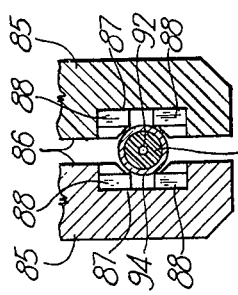
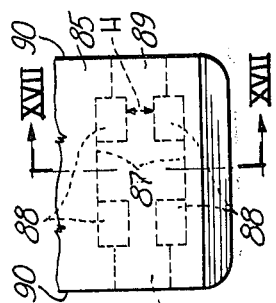
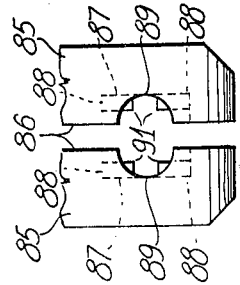
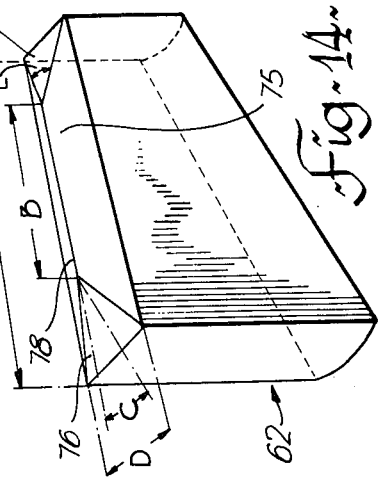
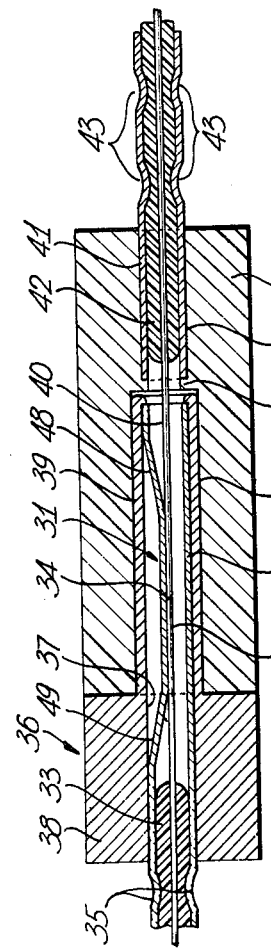

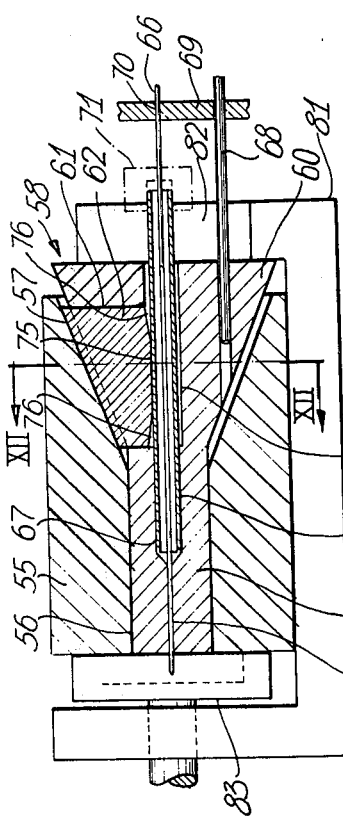
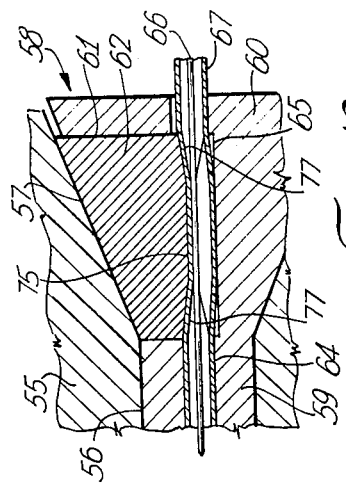
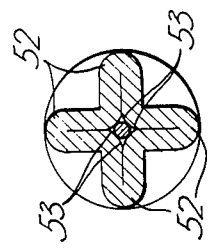
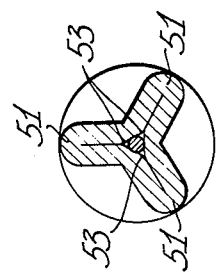
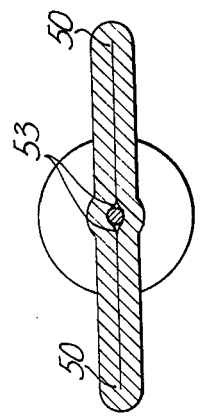
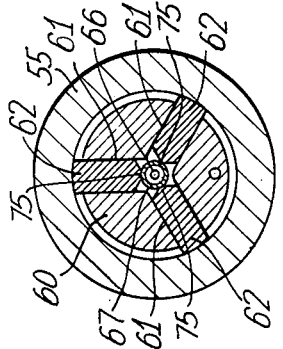

METHOD OF CONNECTING TWO OPTICAL FIBRES IN END TO END RELATIONSHIP

This application is a divisional of application Ser. No. 549,661 filed Feb. 13, 1975, now U.S. Pat. No. 3,972,585.

This invention relates to connecting two optical fibres in an end to end relationship.

Optical fibres are required to be connected, or joined, in accurate abutting alignment. Such joins can be of a permanent form, generally referred to as a splice, and of a breakable and remakeable form, generally referred to as connections.

In all instances accurate axial alignment of the opposed ends of the fibres is necessary as misalignment severely reduces transmission across the join.

There exist several methods, and forms of connectors, for joining fibres but generally these are bulky, particularly where it is desired that the joint be capable of breaking and remaking. An optical fibre is extremely fragile and positioning and holding must be done without damage to the fibres. An optical fibre usually comprises a light conducting core of one predetermined refractive index and having an outer layer of a lower refractive index. The materials are usually glass. An alternative form does not have a separate outer layer, the fibre having a variable index across its radius, the index being higher at the fibre centre and lower at the outer circumference.

The fibre is covered with a flexible material, as an example a plastic, for protection and easier handling.

The present invention provides for the accurate end to end joining of optical fibres by positioning the fibres in a tubular connecting member, the member having a preformed section which has a number of lobes pressed inwards, the radially inward extremities of the lobes defining an axial passage or bore into which the uncoated ends of the fibres can slide. After positioning the fibres in end to end relationship, the plastic coating is gripped by crimping. In a splice a single member is used and crimped on to the plastic coating on either side of the preformed section. In a connector the preformed section is in one tube and adjacent to one end of the tube, the tube being crimped on to the plastic coating at a position on the side of the preformed section remote from the one end. A second tube is crimped on to the plastic coating of the other fibre, the other fibre entering the first tube and the two tubes held in a coupling member.

Before being positioned in the connecting member, the ends of the fibres are stripped of the coating and the end surfaces prepared to be smooth, flat, and perpendicular to the axis of the fibre.

The invention will be readily understood by the following description of certain embodiments, by way of example, in conjunction with the accompanying drawings, in which:

FIG. 1 is a perspective view of a connecting member with a preformed section;

FIG. 2 is a plan view of a member as in FIG. 1 with two fibers in position, and crimped, to form a splice;

FIG. 3 is a cross-section on the line III—III of FIG. 2;

FIG. 4 is an end view of the member in FIG. 1;

FIG. 5 is a cross-section on the line V—V of FIG. 2;

FIG. 6 is a cross-section on the line VI—VI of FIG. 2;

FIG. 7 is a longitudinal section through a connector comprising a connecting member and a further tubular member;

FIGS. 8, 9 and 10 are cross-sections illustrating alternate preformed sections of connecting members;

FIG. 11 is a somewhat diagrammatic cross-section through one form of tool for preforming the connecting members;

FIG. 12 is a cross-section on the line XII—XII of FIG. 11;

FIG. 13 is a cross-section similar to that of FIG. 11, illustrating part of the tool, in an operated condition;

FIG. 14 is a perspective view of one of the preforming members of the tool illustrated in FIGS. 11, 12 and 13;

FIG. 15 is a side view of part of a crimping tool, the tool in an open position;

FIG. 16 is a plan view of the part of a tool in FIG. 15;

FIG. 17 is a cross-section on the line XVII—XVII of FIG. 16, the tool in an open position and a cornecting member and coated fibre in position;

FIG. 18 is a cross-section similar to that of FIG. 17, but showing the tool in a closed position with a connecting member crimped on to a coated fibre.

FIG. 1 illustrates a tube 10 which has a preformed section 11 approximately at the center of its length. The preformed section, in the example illustrated, is formed by deforming or pressing radially inwardly the wall of the tube inwards at three positions 12 around the axis of the tube. This is seen in FIG. 6, the pressing-in forming three lobes 13. The correct form—to give a predetermined central bore or aperture—is obtained by pressing the tube wall down into contact with a mandrel, as will be described.

The connecting member illustrated in FIG. 1 is particularly suitable for permanently joining or connecting two optical fibres end to end, that is a splice. A typical splice is illustrated in FIGS. 2 and 3. As seen in FIG. 3, two optical fibres 15 and 16 are inserted into the tube 10, one from each end. The plastic coatings, 17 and 18 respectively, are removed for a short distance. The tube 10 has an inside diameter which is a sliding fit on the outside of the plastic coating.

The fibres are arranged to abut at the centre of the preformed section, or to be in very close end to end relationship at 19. The preforming is arranged to give inclined surfaces 20 and 21 at each end of the pressed in portion, these surfaces serving to guide or lead the fibres into the central bore. The central bore is of a dimension to give a close sliding fit on the uncoated fibre.

After positioning the fibres 15 and 16 in the tube, the tube is crimped at each end at 22 and 23. Two closely spaced pairs of crimps are produced at each end of the tube. The crimping engages the tube 10 with the plastic coatings 17 and 18 and prevents endwise, or axial, movement of the fibres.

The crimps 22 and 23 are seen in FIG. 2 and a cross-section through crimps at one position is seen in FIG. 5. FIG. 6 illustrates a fibre 15 in position and also illustrates the cross-sections of the preformed section 11.

FIG. 7 illustrates an alternative form for releasably joining or connecting two fibers. A connecting member 30 has a preformed section 31 at a position towards one end. The preformed section is the same as the section 11 in FIG. 1, that is the tube wall is pushed in at three positions around the axis. A first fibre 32 is inserted into the member 30, the plastic coating 33 having been removed for a short length at the end. The end of the fibre is arranged to be at a predetermined position in the preformed section 31, as indicated at 34. After positioning the fibre the tubular end of the connecting member is crimped on to the plastic coating at 35. Conveniently the tubular end is crimped at two spaced apart positions as in FIGS. 2 and 3.

The connecting member 30 is positioned in a first connector housing member 36. Connector housing member 36, in the example illustrated, has a bore 37 which is a sliding fit on the connecting member 30. There is also a rear portion 38 of substantial radial thickness and a forward portion 39 of reduced diameter.

A second fibre 40 is held in a further member 41. The plastic coating 42 is removed for a short length and the fibre extends beyond the member 41 a predetermined amount. The member 41 is crimped on to the plastic coating 42 at 43. Member 41 is positioned in a second connector housing member 44. Member 44 has an axial bore 45 in which tube 41 is a sliding fit, the end of the tube 41 abutting against an inwardly projecting stop 46. Beyond the stop 46 the housing member 44 has an axial bore 47 for the reception of the forward portion 39 of the first housing member 36. The enlarged rear portion 38 of the first housing member 36 abuts against the end of the second housing member 44, in the example illustrated. The ends of the fibres 32 and 40 can thus be brought into accurate end to end relationship. The two housing members can be held together by any convenient method, for example by enclosing in a heat shrinkable tube; by providing interengaging formations; or by providing some form of screw fastening. The connecting member 30 and the further member 41 can be held in the housing members 36 and 44 by various methods, as by mechanical fastening, adhesive bonding and other means.

On assembly of a connector as in FIG. 7, the end of fibre 32 is protected by the portion 39 of housing member 36, and the end of fibre 40 is protected by the second housing member 44. The end of fibre 40 is guided into the bore of the preformed section 31 by the inclined surfaces 48 of the preformed section. Similarly the inclined surfaces 49 guide the end of the fibre 32 on initial assembly of fibre 32 and housing member 36. In a connector, as in FIG. 7 for example, the coated fibres may be crimped into the members 30 and 41 before or after assembly into the housing members 36 and 44.

In all the various forms of splices and connectors an index matching fluid can be placed in the bore of the preformed section.

The number of impressed portions, and lobes, can vary. Thus, two, three and four lobes can be formed. FIGS. 8, 9 and 10 are cross-sections through a preformed section, to a larger scale than in FIGS. 1 to 7. FIG. 8 shows two lobes 50, which create a substantial increase in dimensions in one direction. FIG. 9 shows three lobes 51 as in the examples illustrated in FIGS. 1 to 7. There may be some slight increase in overall radial dimensions, depending upon the wall thickness of the connecting members and forming pressure for example, which can be inconvenient for some applications, such as a connector as in FIG. 7. FIG. 10 shows four lobes 52 which is an alternative form having greater bending stiffness.

When preformed, the bores of the preformed sections do not have to be perfectly circular, and indeed would require very high forming pressures for the bores to be perfectly circular. Small gaps can remain, at the bases of the lobes, as indicated at 53 in FIGS. 8, 9 and 10. By using a tube with an appropriate wall thickness for the connecting member, the lobes 51 can be made to be of the same outside dimensions as the tube outer diameter, as seen in FIG. 9.

FIGS. 11 to 14 illustrate diagrammatically one form of tool for forming the preformed section of a tube. The tool comprises an outer member 55 having an axial bore 56 at the rear end and a tapered bore 57 at the forward end the smaller diameter of the tapered bore being the same size as, and blending into, the axial bore 56.

Mounted for axial movement in the bores 56 and 57 is an inner member 58. Member 58 has a constant diameter portion 59 which is a close fit in the axial bore 56 and a tapered portion 60 corresponding to the tapered bore 57. Formed in the tapered portion 60 are three radial slots 61 in which are mounted three radially movable forming members 62. Extending through the inner member, on the axis thereof, is a bore having three portions 63, 64 and 65 of differing diameters. At the rear end of the inner members, the portion 63 is of small diameter—being of a size to receive a wire 66 which acts as a mandrel. An intermediate portion 64 is of a diameter to receive a tube 67 to be preformed. The forward portion 65 is of a clearance diameter. The three radical slots 61 extend through to the portion 65 and the three forming members 62 extend into the bore portion 65 when pushed inwards.

Extending forwardly from the tapered portion 60 of the inner members 58 is a rod 68 on which is slidably mounted a support member 69. Support member 69 has a small hole 70 therethrough to support the wire 66. The small diameter portion 63 of the bore of the inner member 58 and the support member 69 hold the wire 66 central in the tube 67 prior to forming the tube. The rod 68 is of square cross-section, for example, and the support member 69 slides towards the inner member after the tube 67 and wire 60 have been inserted. An alternative way of supporting the fibre is by a cap on the end of the tube 69 as illustrated in dotted outline 71 in FIG. 11. After forming of the tube the wire 60 is pulled out and the support member slid away from the inner member 58 for removal of the tube 67.

FIG. 11 shows the tool in the "open" condition, that is before forming the tube 67. The tube 67 is pushed into the intermediate bore portion 64 and the wire mandrel 66 is also in position and held central in the tube 67. The three radially movable forming members 62 rest on the outside of the tube 67. The inner member 58 is in a forward position with clearance between the tapered portion 60 of the inner member and the tapered bore 57 of the outer member. The outer ends of the radially movable members 62 are in contact with the tapered bore 57.

Relative axial movement between the inner and outer members 58, 55, forces the radially movable members 62 inwards to form the wall of the tube 67. The tube wall is pushed inwards into firm contact with the wire mandrel 66. This position is shown in FIG. 13. The inner ends 75 of the radially movable members 62 are shaped to produce the desired final cross-section. Thus, in the example of FIGS. 11, 12 and 13, where three lobes are formed—as in FIG. 9, the inner ends 75 of the radially movable members 62 are given a Vee formation, as can be seen in FIG. 12. The Vee formation is chamfered at each end, at 76, to produce an inclined surface 77 at each end of the pressed in portion as illustrated in FIG. 13. These inclined surfaces 77 correspond to the inclined surfaces 20 and 21 in FIG. 3. This is illustrated in FIG. 14; the chamfered portions at 76 and the sharp edge of the Vee formations at 78.

The wire mandrel 66 is of a diameter which is very slightly larger than the diameter of the optical fibre to be positioned in the preformed tube. The tool, as illustrated in FIGS. 11 to 14, can be of varying forms and adapted to suit the method of actuation. While a hand operated tool can be provided, considerable leverage may be necessary to obtain sufficient force on the movable members 62. Practically, the tool can be mounted in some form of press, illustrated diagrammatically in FIG. 11. Thus the tool rests in a holder 81 with the forward end of the inner member 58 against an abutment 82 having an aperture therethrough for the tube 67 and wire mandrel 66. A ram 83 pushes against the rear end of the outer member 55. Actuation of the ram 83 moves the outer member 55 axially and forces the radially movable members 62 inwards. Retraction of the ram 83 enables withdrawal of the radially movable member 62. In the example illustrated the radially movable members 62 are shown freely movable in the slots 61, and are readily pushed outwards on insertion or withdrawal of a tube. However, these members 62 can readily be spring loaded outwards, if desired, as by separate springs acting on a protrusion on each member, or by a spring coil passing through each member 62 and through a clearance hole in the inner member 58.

FIGS. 15 to 18 illustrate one form of tool for crimping the connecting member on to the plastic coating of a fibre. In the example illustrated, two opposed jaws 85 of a crimping tool are shown. Either a hand operated tool or a power operated tool can be used. The jaws 85 each have a particular formation on the inner face 86. Each jaw has a recess 87 having four projections 88. The projections 88 in one jaw face towards, and are a mirror image of, the projections 88 in the other jaw. Each jaw also has semicircular recesses 89 extending from the recesses 87 to the outer faces 90 of the jaws. The recesses 89 are clearance recesses for the reception of the tubular end of the connecting member. FIG. 15 and 16 illustrates the jaws in the open position, without a coated fibre and connecting member. As can be seen, the corners 91 of the projections 88 project beyond the clearance diameter represented by the semicircular recesses 89, and will engage the tubular end of the connecting member.

FIG. 17 is a cross-section through the jaws 85 with a coated optical fibre in a connecting member in position between the jaws, for crimping. The fibre is indicated at 92, the plastic coating at 93 and the connecting member at 94.

As the jaws 85 are pushed together, the corners 91 of the projections 88 distort the wall of the tube 94. The depth of the distortion, or crimp, is set by the distance the outer surfaces of the projections 88 are set back from the faces 86 of the jaws 85. FIG. 18 illustrates a completed crimp of the tubular end of a connecting member on to the plastic coating 93, the faces 86 in contact and limiting the amount of crimp.

The tool as illustrated in FIGS. 15 to 18 produces two pairs of opposed crimped formations, as illustrated in FIGS. 2 and 3. If desired only one pair, or more than two pairs, can be formed. Also the actual form of the crimping can vary, the requirement being that there is restraint against axial movement of the coated fibre in the tube. Also the depth and form of the crimping must be such that no damage is caused to the optical fibre.

As described above, in all of the various embodiments described, an index matching fluid can be provided at the junction between the fibres. In a splice, as illustrated in FIGS. 1, 2 and 3 for example, the index matching fluid can be inserted in the connecting member prior to insertion of the fibres. The viscosity of the fluid maintains it in place prior to inserting the fibres, and after insertion. Similarly, in the connector or coupling as illustrated in FIG. 7, the fluid can be inserted in the preformed connecting member prior to insertion of the fibres. Alternatively the fluid can be inserted after insertion of the fibre to which the connecting member is permanently attached, that is after insertion, and crimping, of fibre 32. The indexing fluid may remain a fluid or be a setting "fluid" such as energy resin.

Multiple splices and connectors can be provided, as when connecting cables having a plurality of fibres. For a cable splice, a connecting element as illustrated in FIG. 1 is provided for each fibre in the cable. For a connector, a multiplicity of devices as illustrated in FIG. 7 can be provided one for each fibre.

Various requirements exist for the various members and parts. Thus the wire mandrel and the movable forming members, for preforming the connecting member, must be harder than the tube material to ensure that they do not deform during the preforming. The mandrel should not be oval, or tapered, as this will be reflected in the preformed bore and cause misalignment of the fibres. Depending upon the properties of the connecting member material, and the original dimensions of the tube, allowance may have to be made for relaxation of the material after preforming.

By using a stepped mandrel and suitably stepped forming members, that is members 62 in FIGS. 11, 12, 13 and 14, a stepped bore can be formed in a connecting member and this will permit splicing or connecting two fibres of different diameters.

A typical example of dimensions and materials is given below, only as an example. Variation in materials and dimensions can be made, to suit differing fibre sizes, coating thicknesses and materials. Various parameters are identified in the drawings, as necessary, and as indicated.

a. Tube—annealed, 321 stainless steel
  — length: 1 inch
  — outside diameter: 0.058 inch
  — wall thickness: 0.009 inch
  — inside diameter: 0.040 inch
b. Mandrel—hard drawn music wire
  — diameter: 0.0068 inch
c. Forming Jaws—hardened tool steel
  — total length of forming end: 0.45 inch—A FIG. 14
  — length of flat section: 0.20 inch—B FIG. 14
  — angle of end taper: 7.5°angle—C FIG. 14
  — width of jaw: 0.15 inch—D FIG. 14
  — enclosed angle: 120°angle—E FIG. 14
d. Fibre—glass cladding diameter: 0.0066 inch
  — coating diameter: 0.036 inch
  — coating material: nylon 6
e. Crimp—length: 0.050 inch—F FIG. 2
  — spacing: 0.060 inch—G FIG. 2
  — width on outside diameter: 0.040 inch—H FIGS. 2 and 16
  — depth of crimp on outside diameter of tube 0.030 inch—I FIGS. 5 and 18 What is claimed is:

1. A method of connecting two coated optical fibres in end to end relationship, comprising:
    preforming a section of a tubular connecting member by radially inwardly deforming said section to form a central bore a close sliding fit on an uncoated fibre;
    inserting a first coated fibre at one end of said tubular connecting member, the uncoated fibre extending into said central bore;
    crimping said tubular connecting member onto said first coated fibre;
    inserting the uncoated fibre of a second coated optical fibre into said central body in end to end relationship with said first fibre.

2. A method as claimed in claim 1, including radially inwardly deforming said section at a plurality of circumferentially spaced positions.

3. A method as claimed in claim 1, including inserting said second coated fibre into the other end of said tubular connecting member and crimping said tubular connecting member onto said second coated fibre.

4. A method as claimed in claim 1, including inserting said second coated fibre into a second tubular member, the uncoated fibre of said second coated fibre extending from one end of said second tubular member;
    crimping said second tubular member on said second coated fibre, and holding said first and second tubular members in axial relationship.

* * * * *